Patented May 23, 1933

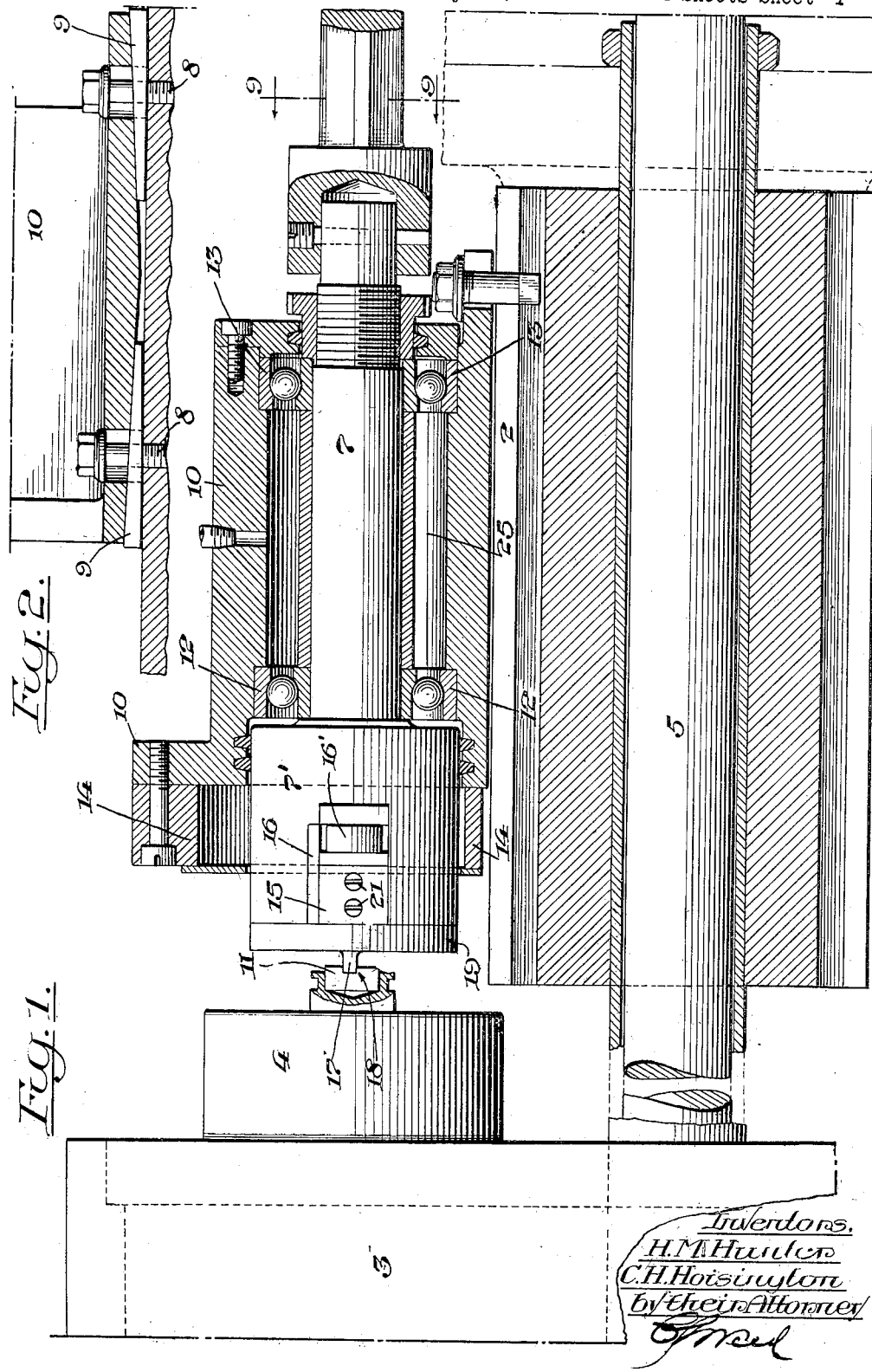

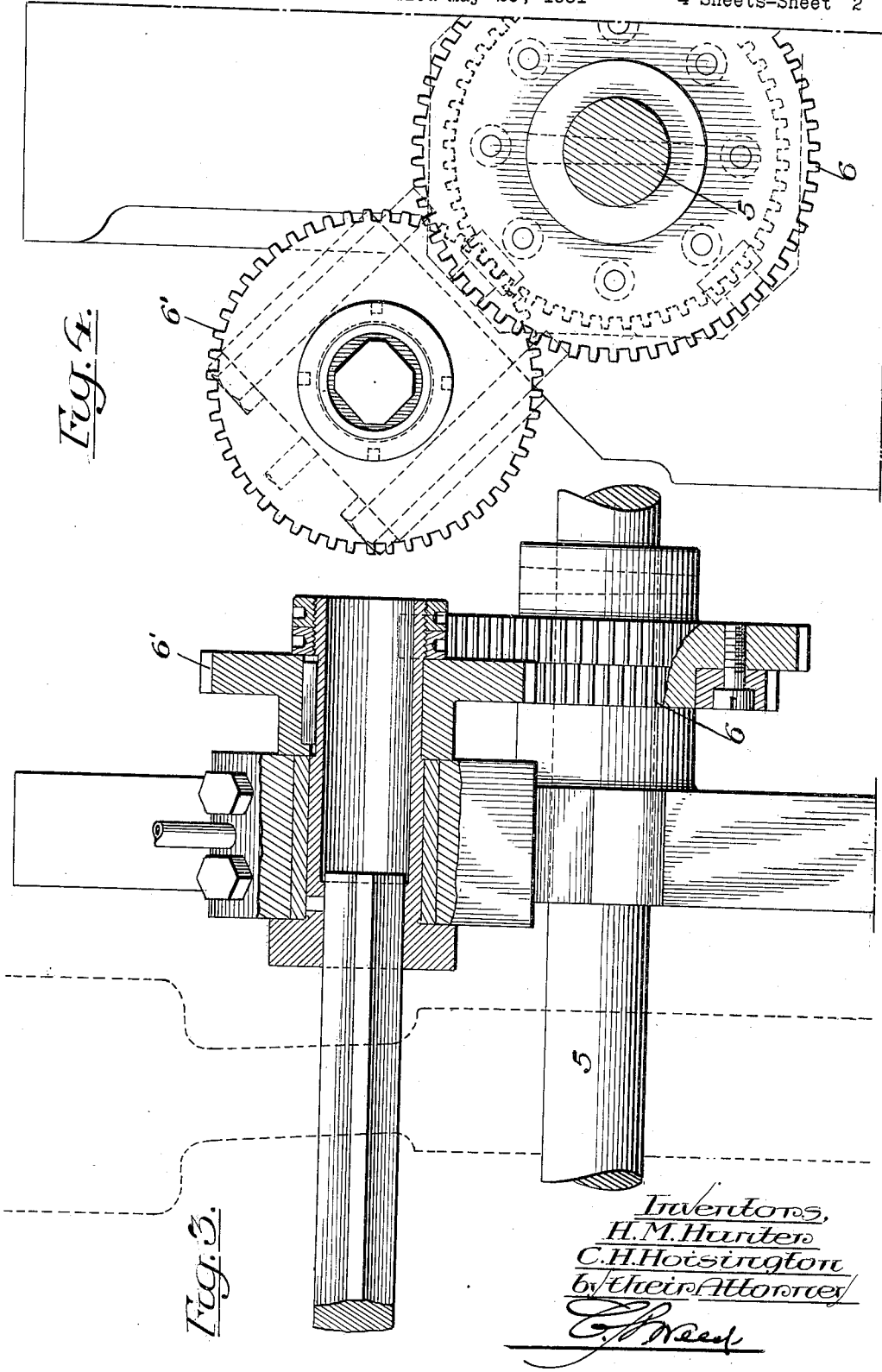

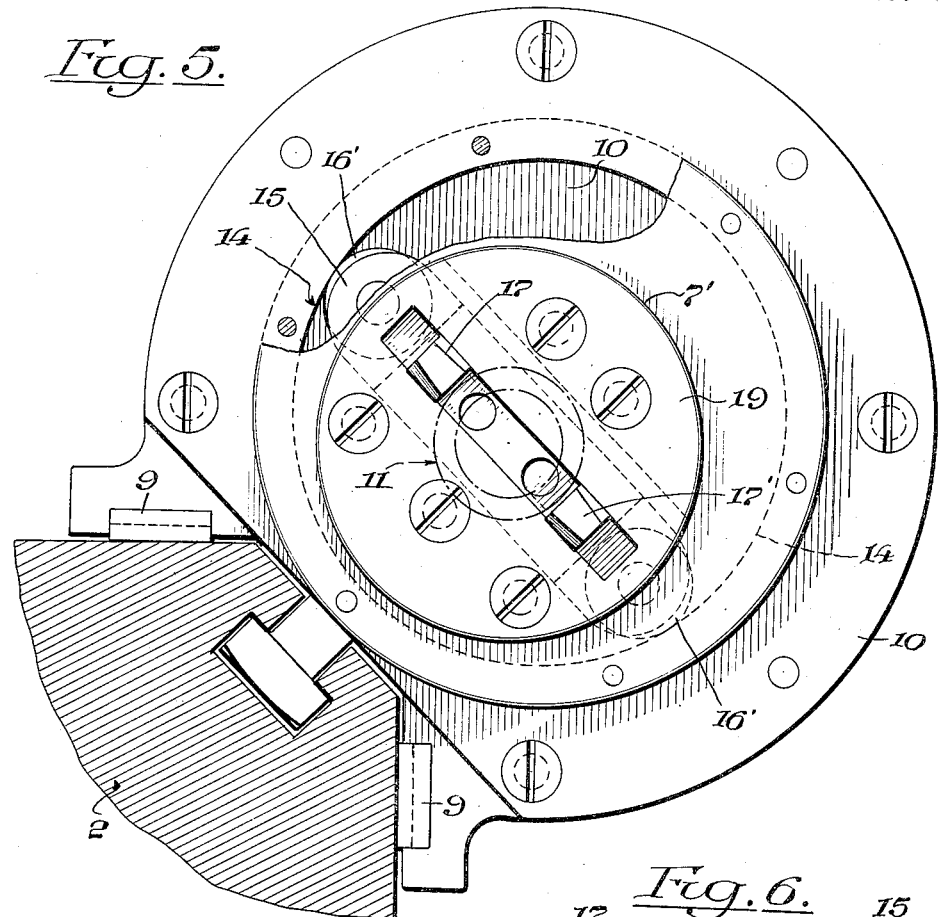
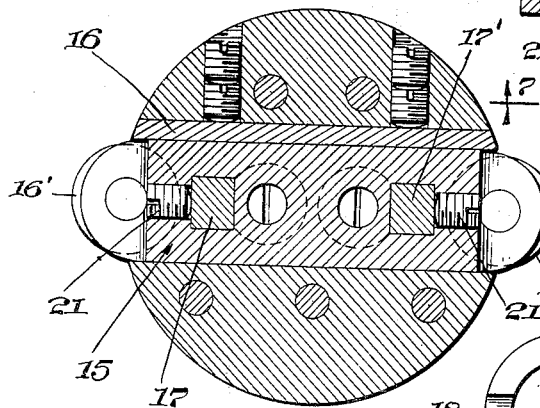
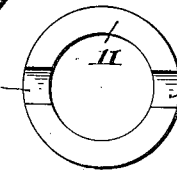

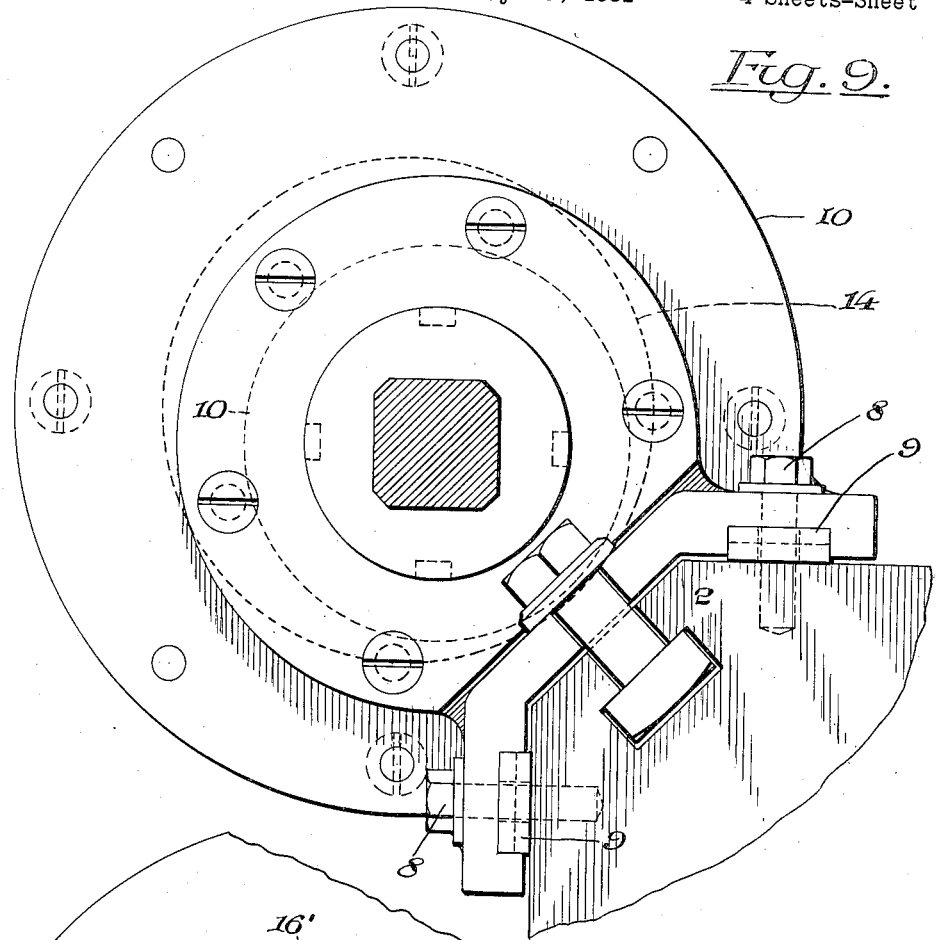
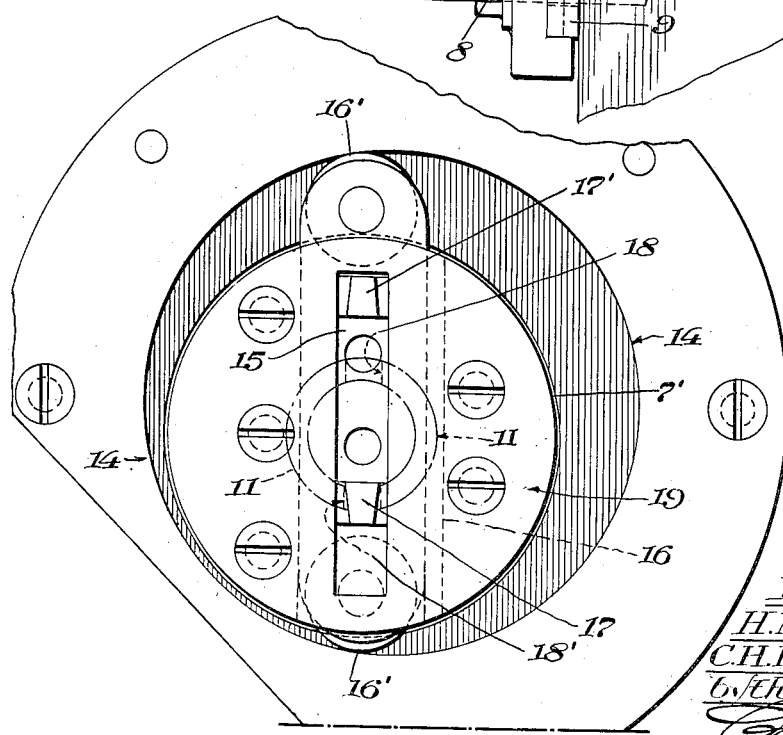

1,910,167

UNITED STATES PATENT OFFICE

HUGH M. HUNTER, OF CLEVELAND, OHIO, AND CYRUS HOUGHTON HOISINGTON, OF WINDSOR, VERMONT, ASSIGNORS TO THE NATIONAL ACME COMPANY, OF CLEVELAND, OHIO, A CORPORATION OF OHIO

SLOTTING ATTACHMENT FOR SPINDLE MACHINES

Application filed May 26, 1931. Serial No. 540,020.

This invention relates to metal working machines and has to do with the provision of an attachment for slotting or cutting grooves in the face of a piece of work, thereby doing away with the necessity of milling it, the object of the invention being to provide an improved attachment and method of slotting a piece of work before it is cut from the bar which is simple in construction and efficient in use, and which attachment may be used with metal working machines of various forms such as multiple spindle machines having an indexible work spindle carrier and a sliding tool carrier, or single spindle machines having a rotary work spindle and an indexible tool carrier, or with chucking machines or hand turret lathes.

A further object of the invention is the provision of means for slotting or grooving a piece of work before it is cut from the bar, in which the work carrier and groove cutting tool will each have rotary movements in the same direction at the same speed and a relatively sliding movement.

A further object of the invention is the provision of a rotary work carrier and a tool carrier sliding one relatively to the other, and carrying one or more rotating and reciprocating grooving or slotting tools, which machine is rapid in operation and will perform its work more efficiently than anything heretofore in use, and by means of which perfectly straight grooves, such as key-ways or oil grooves on the face of the work may be rapidly formed prior to the work being separated from the bar, thereby doing away with the separate operation of using a milling machine or a milling cutter to perform this work.

Heretofore, in cutting grooves or slots in the face of the work, a milling cutter has been used or the piece has been operated upon by a separate attachment to mill this slot, but this generally leaves, as illustrated by a Fillister head screw, a radius in the slot.

On work where the shoulder or head of the screw is long enough, the radius and depth of the slot is of no great importance but on short work, such as illustrated herein, there is not sufficient material available in a piece of work to permit this and, therefore, a perfectly straight cut is essential, especially where a key or some other locking means is to be used to accurately fit the slot and have the advantage of a bearing width over the total surface of the slot.

In the drawings accompanying and forming a part of this specification, Fig. 1 is a vertical sectional view of this improved attachment applied to an automatic multiple spindle machine.

Fig. 2 is a sectional view illustrating the gibs that may be used in the application of the attachment to the main tool slide of the machine.

Fig. 3 is a sectional view of the gear mechanism for operating the rotary spindle of this attachment.

Fig. 4 is a view, partly in dotted lines, of the right hand end of Fig. 3.

Fig. 5 is a view of the front end of the attachment partly in section and partly broken away.

Fig. 6 is a cross-sectional view of the cutter carrying head or slide, illustrating a slotted piece of work in position for the operation of the tools thereon.

Fig. 7 is a cross-sectional view taken on the line 7—7 of Fig. 6.

Fig. 8 illustrates a piece of work with its face slotted.

Fig. 9 is a right hand end view of Fig. 1, the section being taken on line 9—9 of Fig. 2, and Fig. 10 is a left hand end view of the attachment.

Similar characters of reference indicate corresponding parts in the several views.

Before explaining in detail the present improvement and mode of operation thereof, we desire to have it understood that the invention is not limited to the details of construction and arrangement of parts illustrated in the accompanying drawings, since the invention is capable of other embodiments, and that the phraseology which we employ is for the purpose of description and not of limitation.

In the form shown in the drawings, a multiple spindle machine is partly illustrated having a main tool slide 2 and an indexible work carrier 3, both suitably supported on a base. The work carrier has one or more rotatable work spindles 4, each of which is not only rotatable but indexible with its companion work spindles. Suitable cam means is usually provided for sliding the tool carrier toward and from the work carrier and its work spindles, and means is provided for indexing the work carrier. In practice, the improvement may be applied to a single spindle machine, a chucking machine, or to a hand lathe, if desired.

When the attachment is applied to a multiple spindle machine, an axial driving shaft 5 is provided for rotating the work spindles of the work carrier at a certain speed, this being done by means of gearing carried by the work spindles and the driving shaft and, in the present instance, a driving shaft gear 6 is utilized to rotate the slotting attachment spindle or shaft 7.

In the present application of the attachment, it is shown, as stated, applied to a multiple spindle machine, and for that purpose, the attachment is fastened to the main tool slide 2 by suitable screws 8, tapered gibs 9 (see Fig. 2) being provided to adjust the height of the attachment to the exact center of the work spindle should there be a slight variation between the main tool slide and the work spindle center. These same gibs 9 can also be used to so adjust the attachment that the piece may be slotted off-center.

Carried by a tubular housing 10 of the attachment is the rotary cutter shaft 7 driven by gears 6 and 6', the former carried by the center work spindle driving shaft 5. This gearing is so arranged that the cutter shaft 7 rotates in the same direction and at the same speed as the work spindle 4 carrying the work 11 to be slotted so that the work and the slotting tool will always be in positive alignment and if the work spindle 4 is run, for instance, at 100 R. P. M., the cutter shaft 7 will rotate at the same speed.

The housing 10 carrying the cutter shaft 7 is fastened to the main tool slide and is, therefore, reciprocated endwise by the travel of the cam reciprocating the main tool slide 2 and the attachment is, therefore, adjustable endwise on the main tool slide 2 for any depth of slot desired. The housing is provided with two sets of anti-friction bearings 12 and 13 to support the rotating cutter spindle or shaft 7. These bearings are adjustable and held in place by suitable nuts.

The forward end of this cutter spindle or shaft 7 is enlarged as at 7', and rotates partly within a ring 14 which is hardened and ground on the inside and is bolted to the face of the housing 10, being held in place by suitable screws and dowel pins, this ring being located off-center or eccentrically to the axis of the cutter shaft 7.

Located in the forward enlarged end or head 7' of the cutter shaft 7 is a slide 15, the head of the cutter shaft 7 being milled crosswise thereof for the slide 15. An adjusting gib 16 is provided to take up the wear of this slide.

The slide 15 is provided in the present instance with a pair of rollers 16' positioned to contact with the inner surface of the hardened ring 14 which, as before stated, is located off-center relatively to the cutter shaft or spindle 7 and, therefore, when the cutter shaft 7 is rotating, the slide 15, through the medium of the roller and the hardened ring, is caused to travel back and forth the distance as predetermined by the location of the ring 14, which distance can be from $\frac{1}{16}$ of an inch to any desired length of travel.

In other words, the structure is so designed that the cutter travels the length of the face of the work to cut the desired slot and also to cut any desired width of slot plus a slight clearance for the tool.

The slide 15 is provided with a pair of tools 17 and 17', one for each slot 18 and 18' of the bored work 11, (see Fig. 8) held in place by suitable binding screws 21. The cutter slide is held in place by a front plate 19.

The shape of the tool will conform to the shape of the work to be cut, the form of work illustrated in the drawing, Fig. 8, being a plain ring 11 having a pair of slots 18 and 18' therein. The slot in this piece of work has straight corners but if any other shape is desired, the tools can be ground to suit the work.

If only one slot is to be formed on one face of a piece of work, it is merely necessary to remove one of the tools and utilize the other to cut straight across the face of the work.

If four, six or more slots are required, the rotating cutter head 7' is provided with a corresponding number of slides, each slide being controlled by a roller and operated by the hardened ring 14 located off-center. In such a case, a spring would be provided between the slides so as to maintain the individual slides continuously in contact with the hardened ring 14.

In operation, the cutter spindle or shaft 7 is rotated at the desired cutting speed corresponding to that of the drilling, forming, reaming or threading speed of the machine when the attachment is used with a multiple spindle machine, and after the drilling, forming and other work has been performed on the work, the piece of work is indexed into position in alignment with the slotting attachment, or the tool turret is indexed into position when the attachment is used with a single spindle automatic machine in readiness to slot the work.

This slotting is generally done as one of the last operations before the piece is cut off from the bar, or if the slotting attachment is used on a chucking machine where the work is made of forgings, castings, etc., the slotting can be done in any position suitable for the operation.

The operation of the slotting attachment is controlled by the main tool slide 2 while the work carried by the work spindle and the slotting tool of the attachment are rotated at the same speed and in the same direction, the tool slide advancing toward the work in the work spindle at a predetermined feed such as that used for drilling, recessing, counterboring or trepaning tools.

With every revolution of the work spindle, the slotting tool will slide back and forth across the piece of work and cut a groove to the required depth, the necessary feed for advancing the slotting tool being controlled by the main tool slide cam. This feed is usually from .005" to .010" per revolution so that there is no extreme strain on the slotting tools and the operation can be performed with accuracy and speed and without any loss of production or additional expense as would result by a second operation so that the work can be cut off and dropped from the automatic machine completely finished with the slot in the face thereof.

As hereinbefore stated, the shape of the groove or slot is controlled by the shape of the tools, the depth by the main tool slide cam and the speed by the work spindle which is geared to suit the correct cutting speed, this being determined by the other operations to be performed by the machine and the hardness of the material.

While in the present instance only two slotting tools are shown on the attachment, the number of tools and number of slots are naturally controlled by the work.

The bearings for the cutter spindle or shaft 7 which, in some cases as on small automatics, are run at a high spindle speed, are completely housed and provided with an oil reservoir 25 so that the attachment can be used for either high speed or low speed machines and is an independently interchangeable attachment which may be changed from one machine to another provided they are the same size and construction and, therefore, no special design of machine is necessary to carry the attachment.

Thus, it will be seen that, in the present improvement, the slotting tools run in the same direction and at the same speed as the work which keeps the tool in accurate position so that the slots can always be held to an accurate width and shape, as desired for mass production.

It is to be understood that by describing in detail herein any particular form, structure or arrangement, it is not intended to limit the invention beyond the terms of the several claims or the requirements of the prior art.

Having thus explained the nature of our said invention and described a way of constructing and using the same, although without attempting to set forth all of the forms in which it may be made, or all of the modes of its use, we claim:

1. A slotting and grooving attachment adapted for attachment to a tool carrier and comprising a rotatable cutter spindle, a tool carrying slide carried thereby and rotatable therewith, and means operative independently of the work for positively rotating the cutter spindle in unison with the work for shifting said slide during its rotation to cut a slot or groove in the work crosswise thereof.

2. A slotting and grooving attachment adapted for attachment to a tool carrier and comprising a rotatable cutter spindle, a tool carrying slide carried thereby and rotatable therewith, and means operative independently of the work for positively rotating the cutter spindle in unison with the work for shifting said slide during its rotation and located eccentrically to the axis of the rotating cutter spindle to cut a slot or groove in the work crosswise thereof.

3. A slotting and grooving attachment adapted for attachment to a tool carrier and comprising a rotatable cutter spindle, a tool carrying slide carried thereby and rotatable therewith, and means operative independently of the work for positively rotating the cutter spindle in unison with the work for shifting said slide during its rotation and located eccentrically to the axis of the rotating cutter spindle and in position to encircle said slide to cut a slot or groove in the work crosswise thereof.

4. A slotting and grooving attachment adapted for attachment to a tool carrier and comprising a rotatable cutter spindle, a tool carrying slide carried thereby and rotatable therewith, and means operative independently of the work for positively rotating the cutter spindle in unison with the work for shifting said slide during its rotation and located eccentrically to the axis of the rotatable cutter spindle and in position to encircle said slide, said slide having a roller in engagement with said shifting means.

5. A slotting and grooving attachment for a tool carrier and comprising a rotatable member, a tool carrying slide carried thereby and rotatable therewith and having a roller, a housing encircling said rotatable member and having a hardened ring in position to contact with the roller and located eccentrically to the axis of the rotatable member for reciprocating said slide during its rotation, and means operative independently of the work for positively rotating the rotatable member in unison with the work.

6. In a slotting or grooving attachment, the combination of a rotatable work spindle or support and a reciprocating slotting tool shiftable in a straight path across the work and rotatable in the same direction and at substantially the same speed as the work spindle, and means operative independently of the work for positively rotating the slotting tool in unison with the work spindle.

7. In a slotting or grooving attachment, the combination of a rotary work spindle or support and a sliding and reciprocating and rotatable slotting tool carrier shiftable across the work, the work and tool carriers being rotatable in the same direction and at substantially the same speed, and means operative independently of the work for positively rotating the tool carrier.

8. In a machine having a rotatable work spindle or support and a tool carrier, one sliding relatively to the other and one indexible relatively to the other, a slotting attachment carried by the tool carrier and brought into operation against the face of the work by the sliding of one of said parts and rotatable with the work at substantially the same speed and in the same direction, and means operative independently of the work for positively rotating the tool carrier.

9. In a machine of the class described having a tool carrier and a rotatable work carrier sliding one relatively to the other, a slotting attachment carried by the tool carrier and comprising a housing, a rotatable cutter spindle carried thereby, and means for rotating it, a slide carried by the cutter spindle and adapted to carry a slotting tool, said housing having a part thereof located off-center relatively to the cutter spindle and effective to operate the slide to shift the slotting across the face of the work, and positively acting means extending rearwardly of the tool carrier for rotating it.

10. In a machine of the class described having a tool carrier and a rotatable work carrier sliding one relatively to the other, a slotting attachment carried by the tool carrier and comprising a housing, a rotatable cutter spindle carried thereby and means for rotating it, a slide carried by the cutter spindle and adapted to carry a slotting tool, said housing having a part thereof located off-center relatively to the cutter spindle and effective to operate the slide to shift the slotting tool across the face of the work, said slide having a roller, and positively acting means extending rearwardly of the tool carrier for rotating it.

11. A multiple spindle machine having a work carrier provided with rotating work spindles and a driving shaft, a sliding tool carrier, a slotting attachment carried by the tool carrier and movable therewith and comprising a housing having a hardened ring, a rotary cutter spindle within the housing, and a slide carried by the cutter spindle, said ring being located off-center relative to the axis of the cutter spindle and effective to shift the slide across the face of the work, thereby to slot the same prior to the work being cut from the bar.

12. The method of slotting a piece of work prior to the cutting thereof from the bar which consists in simultaneously rotating the work and slotting means independently of each other but in unison and in the same direction at substantially the same speed and during such rotation reciprocating the slotting means in a straight path across the face of the work.

13. In a metal working machine having a rotatable work carrier and a tool carrier, one indexible relatively to the other, and a slotting and grooving attachment carried by the tool carrier and comprising a rotatable cutter spindle, a tool carrying slide carried thereby and rotatable therewith, and means operative independently of the work for positively rotating the cutter spindle in unison with the work for shifting said slide back and forth in a straight path during its rotation and located eccentrically to the axis of the spindle.

14. In a metal working machine having a rotatable work carrier and a tool carrier, one indexible relatively to the other, and a slotting and grooving attachment carried by the tool carrier and comprising a rotatable cutter spindle, a tool carrying slide carried thereby and rotatable therewith, and means operative independently of the work for positively rotating the cutter spindle in unison with the work for shifting said slide back and forth during its rotation and located eccentrically to the axis of the spindle, said rotatable work carrier and cutter spindle being rotatable at the same speed in the same direction.

15. In a metal working machine having a rotatable work carrier and a tool carrier, one indexible relatively to the other, and a slotting and grooving attachment carried by the tool carrier and comprising a rotatable cutter spindle, a tool carrying slide carried thereby and rotatable therewith and shiftable in a straight path across the face of the work, means encircling said slide for shifting said slide, and means operative independently of the work for positively rotating the cutter spindle in unison with the work.

16. In a metal working machine, the combination of a work carrier having a rotatable work spindle, a main tool slide, a driving shaft located axially of the work carrier and tool slide, and a slotting or grooving attachment secured to the tool slide and comprising a rotatable cutter spindle, means operative independently of the work and connected with the driving shaft for rotating the cutter spindle at the same speed as the work spindle and in the same direction, a cutter slide carried by the cutter spindle, a housing for said cutter spindle and having means eccentrically located relative to the cutter spindle for reciprocating the cutter slide across the face of the work.

17. In a metal working machine, the combination of a work carrier having a rotatable work spindle, a main tool slide, a driving shaft located axially of the work carrier and tool slide, and a slotting or grooving attachment secured to the tool slide and comprising a rotatable cutter spindle, means connected with the driving shaft for rotating it at the same speed as the work spindle and in the same direction, a cutter slide carried by the cutter spindle, a housing for said cutter spindle and having means eccentrically located relative to the cutter spindle for reciprocating the cutter slide across the face of the work and comprising a hardened ring encircling said cutter slide and a roller carried by the cutter slide for contact with said ring.

18. In a metal working machine, the combination of an indexible work carrier having a rotatable work spindle, a main tool slide, a driving shaft located axially of the work carrier and tool slide, and a slotting or grooving attachment adjustably secured to the tool slide and comprising a rotatable cutter spindle, means connected with the driving shaft for rotating it at the same speed as the work spindle and in the same direction, a cutter slide carried by the cutter spindle, a housing for said cutter spindle and having means eccentrically located relative to the cutter spindle for reciprocating the cutter slide across the face of the work and comprising a hardened ring encircling said cutter slide and a roller carried by the cutter slide for contact with said ring.

19. In a metal working machine, the combination of a work carrier having a rotatable work spindle, a main tool slide, a driving shaft located axially of the work carrier and tool slide and a slotting or grooving attachment interchangeably and adjustably secured to the tool slide and comprising a rotatable cutter spindle, means connected with the driving shaft for rotating it at the same speed as the work spindle and in the same direction, a cutter slide carried by the cutter spindle, a housing for said cutter spindle and having means eccentrically located relative to the cutter spindle for reciprocating the cutter slide across the face of the work and comprising a hardened ring encircling said cutter slide and a roller carried by the cutter slide for contact with said ring.

20. In a machine having a rotatable work spindle or support and a tool carrier, one sliding relatively to the other and one indexible relatively to the other, a slotting attachment interchangeably and adjustably carried by the tool carrier and having a reciprocating cutter and brought into operation against the face of the work by the sliding of one of said parts in a straight path and rotatable with the work at substantially the same speed and in the same direction, and means operative independently of the work for positively rotating the cutter in unison with the work.

21. The method of slotting a piece of work prior to the cutting thereof from the bar which consists in simultaneously rotating the work and slotting means in the same direction at substantially the same speed, the rotation of the slotting means being effected positively independently of the rotation of but in unison with the work and during such rotation reciprocating the slotting means in a straight path across the face of the work.

22. A slotting and grooving attachment adapted for attachment to a tool carrier, a tool carrying slide carried by said attachment, means independent of the work for positively rotating said slide in unison with the work, and means for shifting said slide during its rotation cross-wise of the work to cut a slot or groove in the work transversely thereof.

Signed at Cleveland, Ohio, this 13th day of May, 1931.

HUGH M. HUNTER.

Signed at Windsor, Vermont, this 18th day of May, 1931.

C. HOUGHTON HOISINGTON.